(12) United States Patent
Dahl

(10) Patent No.: US 9,013,190 B2
(45) Date of Patent: Apr. 21, 2015

(54) DIGITAL DELAY MEASUREMENT

(71) Applicant: Digi International Inc., Minnetonka, MN (US)

(72) Inventor: Paul A. Dahl, Pleasant Grove, UT (US)

(73) Assignee: Digi International Inc., Minnetonka, MN (US)

( * ) Notice: Subject to any disclaimer, the term of this patent is extended or adjusted under 35 U.S.C. 154(b) by 323 days.

(21) Appl. No.: 13/663,183

(22) Filed: Oct. 29, 2012

(65) Prior Publication Data

US 2013/0106439 A1    May 2, 2013

Related U.S. Application Data

(60) Provisional application No. 61/552,573, filed on Oct. 28, 2011.

(51) Int. Cl.
| | |
|---|---|
| *G04F 1/00* | (2006.01) |
| *G01S 13/46* | (2006.01) |
| *G01S 13/76* | (2006.01) |
| *G01S 5/14* | (2006.01) |

(52) U.S. Cl.
CPC . *G01S 13/46* (2013.01); *G01S 5/14* (2013.01); *G01S 13/767* (2013.01); *G01S 2013/466* (2013.01)

(58) Field of Classification Search
CPC ................................. G04F 10/04; G01R 25/00
USPC ................................................ 324/76.11, 617
See application file for complete search history.

(56) References Cited

U.S. PATENT DOCUMENTS

| | | | |
|---|---|---|---|
| 6,014,354 A * | 1/2000 | Nomura et al. | 369/44.28 |
| 2008/0111597 A1 * | 5/2008 | Cranford et al. | 327/156 |
| 2010/0009696 A1 * | 1/2010 | Fok et al. | 455/456.1 |
| 2011/0075763 A1 * | 3/2011 | Shim et al. | 375/309 |

\* cited by examiner

*Primary Examiner* — Vincent Q Nguyen
(74) *Attorney, Agent, or Firm* — Fogg & Powers LLC

(57) ABSTRACT

Distance between two devices is determined by sending a digital signal from a first device to a second device, and receiving a repeated signal from the second device in the first device. The repeated signal includes the digital signal sent from the first device resent by the second device. A time difference between the sent digital signal and the received repeated signal is determined by providing both the sent digital signal and the received repeated signal to a logic gate, the output of the logic gate indicating whether the digital signal and the received repeated signal are at same or different states. The output of the logic gate is evaluated to determine an approximate distance between the first device and the second device.

7 Claims, 2 Drawing Sheets

US 9,013,190 B2

DIGITAL DELAY MEASUREMENT

CROSS REFERENCE TO RELATED APPLICATIONS

This application claims the priority of U.S. provisional application Ser. No. 61/552,573, filed Oct. 28, 2011, which is incorporated herein by reference in its entirety.

FIELD OF THE INVENTION

The invention relates generally to measurement, and more specifically in one embodiment to measuring the delay between two digital signals.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Many of today's computers, cellular telephones, and other such devices rely on wireless communication to exchange information with other devices, such as to surf the Internet, send and receive email, and communicate audio and video. Many such devices also include GPS, useful in that it enables a person to determine where they are, overlay their location on a map, and get directions. GPS signals are often also used by other applications, such as a restaurant review application that shows reviews of restaurants near a user, or a shopping application that shows stores near a user that have a particular item for sale.

But, GPS signals are difficult to receive in some cities with tall buildings or other interference, and GPS is often left out of lower cost devices. Some devices therefore use cellular phone towers or other radio signals having known location to use as a reference, and can determine approximate position of a mobile radio device by estimating the distance from the mobile wireless device to multiple cellular towers. This can be performed such as by using chirp signals and measuring the time of flight between RF devices, but accuracy is dependent in part on synchronization between the two devices. Such methods are particularly suited to chirp-modulated communication systems, where the offset of the carrier frequencies between the transmitter and receiver appears as a time offset at the receiver.

In a system where a chirp signal is sent and returned, the outgoing signal can be mixed with the incoming or returned signal to produce a signal with a fixed frequency at the output of the mixer. This frequency indicates the distance between the nodes. In another range finding system, the returned signal is digitized and autocorrelated with the transmitted digital signal to determine the delay between the transmitted signal and received signal.

There exists a need to provide easy and accurate signal delay measurements in wireless systems, such as for radio ranging.

SUMMARY

Some example embodiments of the invention comprise determining a distance between two devices by sending a digital signal from a first device to a second device, and receiving a repeated signal from the second device in the first device. The repeated signal comprises the digital signal sent from the first device resent by the second device. A time difference between the sent digital signal and the received repeated signal is determined by providing both the sent digital signal and the received repeated signal to a logic gate, the output of the logic gate indicating whether the digital signal and the received repeated signal are at same or different states. The output of the logic gate is evaluated to determine an approximate distance between the first device and the second device.

DETAILED DESCRIPTION

Figure 1:
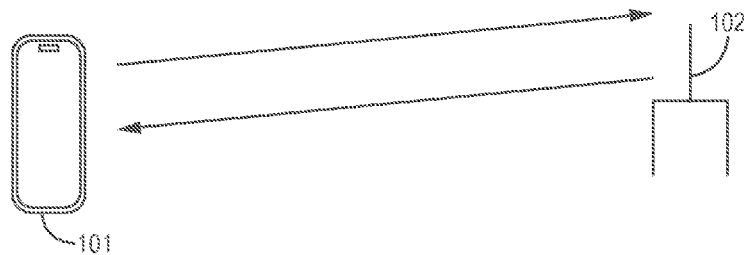
FIG. 1 illustrates a mobile RF device and fixed RF device, as may be used to practice some example embodiments of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Wireless networks with movable devices or nodes have become increasingly common, including cellular data devices such as smart phones, mesh network devices that can be placed to form an ad-hoc network, and Wi-Fi enabled devices such as laptop computers and smart phones or personal digital assistants. It is often desirable to determine the physical location of such devices, such as to location information to a user such as through a mapping application, to provide location-specific information or services, or to provide asset tracking of the device. Cellular smart phones, for example, often include GPS, but typically also can perform or refine location determination based on determined distance from the device to cellular telephone towers having known locations.

Other wireless networks such as mesh networks are often used to route data between various elements or nodes in a network made up of a number of loosely assembled nodes. Mesh networks are designed such that a compatible node can easily join the network and receive and send data, including passing received data long a route to an intended destination node. Mesh networks are therefore considered self-arranging and self-healing, in that if a node becomes inoperable or loses a connection to another node, data can be easily routed around the broken network link.

Many mesh network technologies use wireless communication, further enhancing the ease of use of mesh networking for certain applications. Because deployed mesh network nodes are typically stationary for some period of time, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network or other type of network. One example of a mesh network standard using wireless radio communication is the ZigBee mesh network, which was developed by an industry alliance and is related to IEEE standards including 802.15.4. Other wireless networks include 802.11 standards such as a, b, g, and n, more commonly known as WiFi, used for wireless computer networks.

Distance between nodes is often estimated using relative signal strengths of signals from multiple nodes having known locations to estimate the position of the unknown node, using the radio modems in a WiFi, ZigBee, or DigiMesh network. But, signals can be attenuated or amplified by presence of metal objects in the area, such as in a warehouse environment, making such position determination using signal strength suspect. Because mesh networks are often used in monitoring or tracking applications where the physical location of a node is important, it is often desirable to be able to determine the physical position of a new or mobile node in such a wireless network environment.

Some solutions to network node position determination include using GPS (Global Positioning System) receivers in the nodes, such that the GPS receiver can provide the node with its location. This significantly raises the cost and complexity of the node, as a GPS receiver must then be added to each such node, and the node must be able to receive strong enough GPS signals to make a position determination. Other systems use a common timebase and methods of triangulation or trilateration, but require a significant number of messages be passed from the mobile node to determine time of flight to at least three other nodes with known positions.

The ability to find high value assets is an expensive undertaking in many environments, such as within an engineering facility or hospital where a large amount of movable expensive equipment is distributed throughout a large facility. Determination of asset location is often an expensive and time-consuming task, involving activities such as regular barcode scanning of every asset in a facility or purchase of more assets than are needed to ensure that they can be located when needed.

One example embodiment of the invention therefore provides a solution for location of wireless network nodes, using an exclusive-OR (XOR) function to evaluate a sent digital signal and a returned digital signal. The delay from sending a a digital signal to receiving a returned signal is expected to be short relative to a clock cycle of the digital signal, such that there will always be some overlap between a given bit in the sent digital signal and the same bit in the received digital signal. The amount of overlap will vary with the distance between the two radio devices and the turn-around time, thereby resulting in an XOR gate output that is increasingly on as the distance between radios increases.

FIG. 1 illustrates a mobile RF device and fixed RF device, as may be used to practice some example embodiments of the invention. Here, a mobile wireless device such as a smart phone 101 is able to change location, such as when a user walks or drives around with the phone. In other embodiments, the mobile wireless device is attached to a car, such as an OnStar™ in-car service device, or a two-way radio or wireless data system. In another embodiment, the wireless device is a mesh network device, such as a ZigBee or DigiMesh device that can be installed or moved at various locations, or is attached to a movable device that is networked such as a high-value medical instrument.

In each of these examples, it is desirable to be able to determine the physical location of the device. OnStar™ uses location information to recover lost or stolen vehicles, provide directions, and perform other such owner assistance. A wireless data or radio system in a vehicle can be used to manage logistics and timing, and mesh network nodes can self-report installed position to make accurate maps of sensors, or to track high value assets like medical equipment for factory machinery.

The base station 102 is in various embodiments a fixed or known location device that communicates with the mobile wireless device 101, such as a cell phone tower, Wi-Fi wireless access point, or mesh network controller. The known location of the base station 102 can be used, for example by a position determination module 105 (shown in FIG. 2), along with a determined distance to device 101 to help determine device 101's location, such as by device 101 or base station 102 sending a ranging signal that is repeated with a known turnaround time by the other device, and measuring the propagation time of the signal. Because the propagation time of the signals sent between the two devices 101 and 102 is proportional to the distance between the two devices, this propagation delay can be used to determine the distance between the mobile device 101 and the base station 102.

This establishes that the mobile device is somewhere that is a certain radius from the base station with known position, placing the mobile device somewhere within a sphere around the mobile device. In some embodiments such as vehicle tracking, positions above or below ground can be ruled out, so knowing the distance from a single base station places the vehicle someplace within a circle with a known radius. In other embodiments such as tracking the location of a device in a hospital, the position of the device may be on different floors and so is best described by the sphere around the base station with a known radius.

Performing the same location method with an additional base station in a different location will reduce the point to the intersection of two circles on the ground, such as two points on the ground, or to a circle within three-dimensional space such as within a hospital. Performing a third ranging with a third base station means that the location of the mobile device can be determined as the location of intersection of three circles on the ground or three spheres in three-dimensional space, and can pinpoint the location of the mobile device if the device is in a known plane. If the device is in a three-dimensional space such as a multi-story hospital and the three spheres intersect at two locations, one of them may be ruled out as being below ground or above the hospital if the base stations are placed at the top or bottom floor of the building, enabling accurate three-dimensional position determination with only three base stations.

But, determining the time of flight of a signal making a round trip between mobile device 101 and base station 102 often requires accurate and coordinated clocks, or very accurate device clocks and a mechanism for accurate tracking of the time a signal is sent and a reply signal is received, so that the time of flight of a wireless signal between the devices 101 and 102 can be accurately determined. Some embodiments of the invention seek to simplify determination of the time of flight by applying an exclusive-OR function to sent and received digital signals, and using an averaged magnitude or duty cycle of the exclusive-or output to estimate the time of flight.

Figure 2:
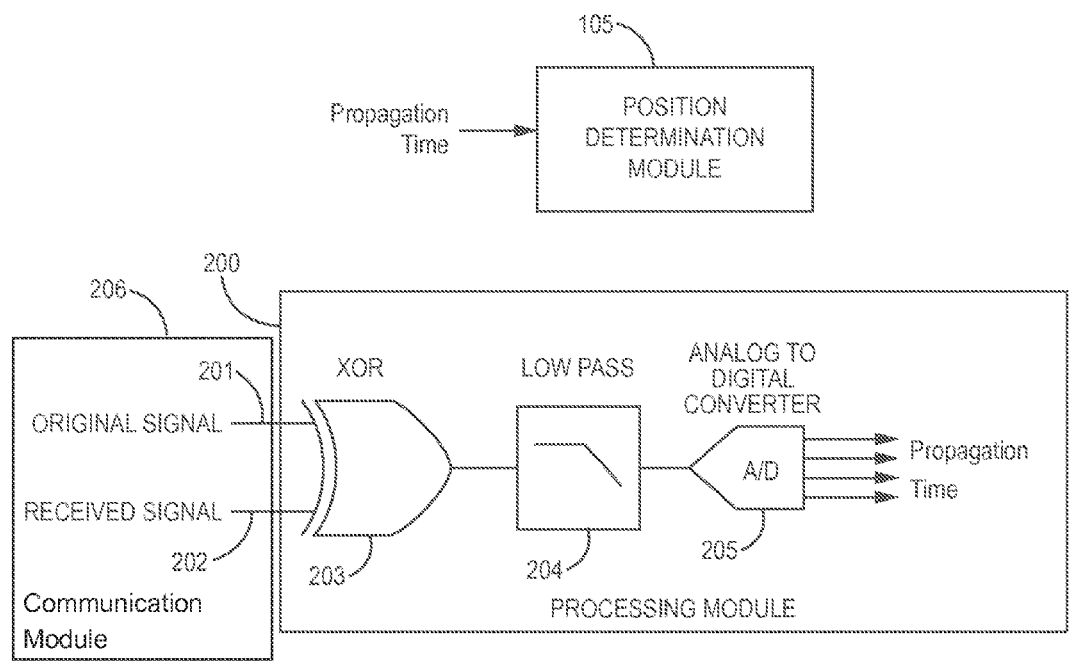
FIG. 2 shows an example exclusive OR circuit for estimating round-trip time of flight of a digital signal, consistent with an example embodiment of the invention.

FIG. 2 shows an example processing module 200 comprising a logic gate exclusive OR (XOR) circuit for estimating round-trip time of flight of a digital signal, consistent with an example embodiment of the invention. The shown apparatus is not limited to wireless signals, but can be used in wired, optical, or other such systems to estimate a link length or time of flight.

Here, an original signal 201 is sent to a remote device, and the remote device repeats the signal back to the sending device which receives a received signal 202 that is simply the original signal time delayed as a result of traveling to the remote device and turnaround time. The delay between the original signal and the received signal is therefore proportional to the distance between the sending device and the received device, minus the turnaround time which can be estimated and subtracted out or otherwise included in the distance calculation. As shown in FIG. 2, original signal 201 and received signal 202 are provided by communication module 206.

The original signal in this example is selected such that the period of the digital signal, or the time during which the digital signal holds each state, is longer than the time of flight plus turnaround time that separate the original signal 201 and the received signal 202. This ensures that each transmitted symbol of the original signal will overlap in time to at least some degree with the same symbol in the received signal 202. Because the amount of overlap between the original and received signals varies in proportion to the time of flight of the signal, which is proportional to the distance between devices, the distance between devices can be measured or estimated based on the amount of symbol overlap between the original signal 201 and the received signal 202.

An unclocked exclusive-or (XOR) gate 203 is therefore employed in this example to output a high state only when the original and received signals are not overlapping. In an alternate embodiment, an exclusive-NOR or XNOR gate can be used to indicate when the symbols are both the same rather than when the symbols are different from one another. In either case, the output is sent to a lowpass filter 204, where the output signal is averaged over time. The output of the lowpass filter therefore indicates the average percentage over a selected period of time that the signal output from the XOR gate 203 has been high or low, and varies in proportion to the overlap or time delay between the original signal 201 and the received signal 202.

This signal is digitized by an analog-to-digital converter 205 and output as a digital signal here, so that the digital representation of the time difference between the original and received signals can be used by other digital electronics, such as to compute a distance between devices, determine a location of a mobile device, plot a mobile device's location on a map, or perform other such functions.

Figure 3:
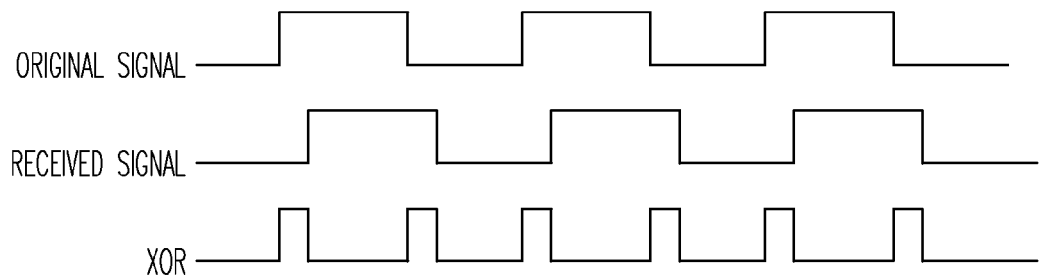
FIGS. 3 and 4 illustrate original and time-delayed received signals, and an exclusive-or function applied to the two signals, consistent with an example embodiment of the invention.
Figure 4:
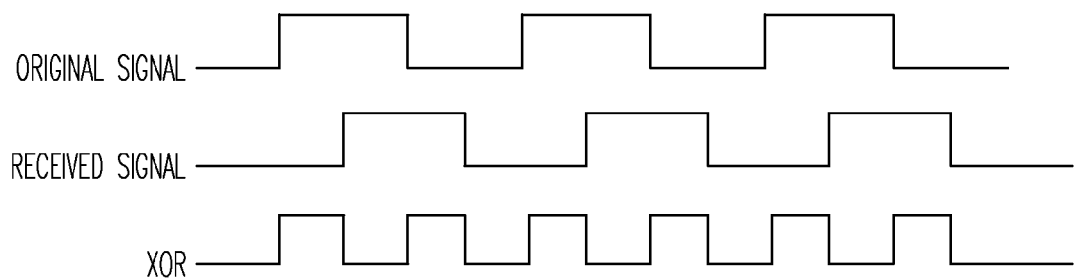

FIGS. 3 and 4 illustrate original and time-delayed received signals, and an exclusive-or function applied to the two signals, consistent with an example embodiment of the invention.

Referring to FIG. 3, the original signal is slightly ahead of the received signal, such that each symbol of the original signal overlaps with nearly all of the same symbol in the received signal. The difference between the original and received signals is reflected in the XOR or exclusive-or signal, which is at a high level only when the original and received signals are not both the same value. The XOR signal in FIG. 3 spends relatively little time in its high state, because the time during which the original and received signals are different is relatively small.

Referring to FIG. 4, the time difference between the original signal and the received signal is somewhat greater, such that symbols in the original signal overlap with the same symbols in the received signal for about half of the period of each symbol. The output of an XOR function between the original and received signals is therefore in a high state about half the time, such that its higher average value reflects a greater difference in time delay between the original and received signals.

When the XOR outputs of FIGS. 3 and 4 are averaged through a lowpass filter, integrator, or other such mechanism, the higher output value observed from the signal timing of FIG. 4 relative to FIG. 3 proportionally indicates the greater time of flight in the received signal of FIG. 4 relative to the received signal of FIG. 3. A lookup table or calculations can then be used to determine the time of flight of the received signal, indicating the distance between two devices.

As discussed previously, other functions can be used to determine the overlap between symbols in other examples, such as an XNOR gate that provides a positive output when the original and received signals are the same rather than when they are different.

The original signal in this example is well-suited to distance determination in that the signal changes state every clock cycle or symbol period, resulting in some period during which the original and received signals are different for every symbol period. In other examples, the original signal may not simply vary between states, but may carry data or be another digital signal. If the signal content is known, such as a signal preamble that contains the same number of state transitions every time, the number of transitions in a period of time can be compensated for in using an XOR or similar function between a sent and received signal to estimate distance. In other examples, average signal characteristics are determined over a great enough period of time that an XOR output averaged over many signal transitions will have approximately a known or estimated number of transitions between low and high state.

In still other embodiments, original signal data is encoded such that the number of transitions per period of time is kept somewhat more constant than unencoded data, such as by using an 8-to-11 bit encoding scheme which enforces three or more transitions between state during each data word. Other coding methods also employ frequent transitions, such as Manchester coding in which the encoding of each data bit always involves at least one transition and occupies the same time period, or return-to-zero coding methods. A variety of other methods for determining or enforcing an approximate average number of transitions per period of time exist, and are within the scope of some embodiments of the invention.

The examples presented here illustrate how using an exclusive-OR function evaluating an original and a received signal can be used to determine the approximate time of flight of the signal, and thereby determine the distance between a sending device and a repeating device that receives the sending device's signal and repeats the signal back with minimal or known delay. The determined distance can be used with other data such as a fixed location of one of the devices to find the location of a mobile device, or to work with other technologies such as GPS to provide enhanced accuracy or location determination when GPS is not available.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof. This application is intended to cover any adaptations or variations of the example embodiments of the invention described herein. It is intended that this invention be limited only by the claims, and the full scope of equivalents thereof.

What is claimed is:

1. An electronic device, comprising:
   a communication module operable to send a digital signal to a second device remote from the electronic device and to receive a repeated signal from the second device, the repeated signal comprising the digital signal resent by the second device;
   a processing module comprising a logic gate, the logic gate coupled to the communication module to receive the digital signal as sent to the second device and the repeated digital signal, the processing module operable to determine a time difference between the sent digital signal and the received repeated signal by indicating whether the digital signal and the received repeated signal are at same or different states, the output of the logic gate indicating an approximate distance between the first device and the second device;
   a lowpass filter coupled to receive the output of the logic gate, the lowpass filter operable to average the output of the logic gate over time; and
   an analog-to-digital converter coupled to an output of the lowpass filter, operable to provide a digital signal representing the approximate distance between the first device and the second device.

2. The electronic device of claim 1, wherein the communication module further comprises a wireless RF transceiver, and the digital signal and received repeated digital signal comprise wireless radio frequency signals.

3. The electronic device of claim 1, wherein the logic gate is an XOR or XNOR logic gate.

4. The electronic device of claim 1, wherein the digital signal is encoded to have frequent state transitions.

5. The electronic device of claim 1, further comprising a position determination module operable to determine a position of a mobile one of the first and second devices using a known location of the other of the first and second devices and the indicated approximate distance between the first device and the second device.

6. The electronic device of claim 1, wherein the device comprises a cellular telephone.

7. The electronic device of claim 1, wherein the device comprises a mesh network node.

* * * * *